(12) United States Patent
Inglese et al.

(10) Patent No.: US 7,104,128 B2
(45) Date of Patent: Sep. 12, 2006

(54) MULTIAXIAL MICROMACHINED DIFFERENTIAL ACCELEROMETER

(75) Inventors: Jérôme Inglese, Guilherand (FR); Bertrand Leverrier, Montelier (FR); Claude Rougeot, Lyons (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/985,029

(22) Filed: Nov. 10, 2004

(65) Prior Publication Data

US 2005/0140356 A1     Jun. 30, 2005

(30) Foreign Application Priority Data

Nov. 25, 2003   (FR)   ................................... 03 13820

(51) Int. Cl.
*G01P 15/00* (2006.01)
*G01P 15/10* (2006.01)

(52) U.S. Cl. ............... 73/514.01; 73/514.38; 73/514.29

(58) Field of Classification Search ............. 73/514.01; 324/162
See application file for complete search history.

(56) References Cited

U.S. PATENT DOCUMENTS

| 5,706,252 | A | 1/1998 | Le Verrier | ................... | 367/152 |
| 6,647,759 | B1 | 11/2003 | Leverrier | ................... | 73/31.05 |
| 2005/0183503 | A1* | 8/2005 | Malametz | ................ | 73/514.01 |

FOREIGN PATENT DOCUMENTS

JP     2000 081338 A     9/2000

* cited by examiner

Primary Examiner—Hezron Williams
Assistant Examiner—Tamiko Bellamy
(74) Attorney, Agent, or Firm—Lowe Hauptman & Berner, LLP

(57) ABSTRACT

The invention relates to a differential accelerometer micromachined in a plane plate, comprising a base and a differential measurement cell which includes a moveable seismic mass and two force sensors that are connected to the mass and to the base. Under the effect of an acceleration along Ox and/or Oy, Ox and Oy being directions orthogonal to the plane of the plate, the seismic mass is capable of undergoing linear displacement along a direction parallel to the acceleration, and has a center of gravity located at the intersection of a plane A1 perpendicular to the plane of the plate and passing through Ox and of a plane A2 perpendicular to the plane of the plate and passing through Oy; a first force sensor comprises, along Ox, two identical detection systems for a differential measurement of the linear displacement along Ox, and associated with each detection system a filtering system connected to the base, and a second force sensor comprises, along Oy, two other identical detection systems for the differential measurement of the linear displacement along Oy, and associated with each detection system a filtering system connected to the base, each filtering system allowing the associated detection system to move along a direction perpendicular to that of its detection without permitting it to move along its detection direction.

15 Claims, 3 Drawing Sheets

MULTIAXIAL MICROMACHINED DIFFERENTIAL ACCELEROMETER

RELATED APPLICATIONS

The present application is based on French Application and claims priority from Application Number 03 13820, filed Nov. 25, 2003, the disclosure of which is hereby incorporated by reference herein in its entirety.

BACKGROUND OF THE INVENTION

The invention relates to a microaccelerometer, that is to say an inertial micromechanical sensor dedicated to the measurement of accelerations, produced by micromachining techniques.

The field of the invention is that of flat monolithic accelerometers. The flat structure allows simple and inexpensive fabrication, especially by chemical etching processes. In addition, the fabrication can be collective.

DESCRIPTION OF THE PRIOR ART

A flat monolithic differential accelerometer conventionally comprises a body having a base and a differential measurement cell. A differential measurement cell typically comprises a seismic mass connected, on one side, to the base and on the other side to two force sensors for carrying out a differential measurement, these sensors themselves also being connected to the base. When the accelerometer is subjected to an acceleration along the sensitive axis, which is the axis of the acceleration to be measured, the seismic mass is subjected to an inertial force that is transmitted to the force sensors via means that optionally amplify the force or the movement transmitted.

The force sensor is for example a vibrating beam. The vibrating beam is connected to electrodes for making it vibrate at its resonant frequency and to a circuit for measuring the variation of its resonant frequency.

The two force sensors are mounted so that, when the accelerometer is subjected to an acceleration along the sensitive axis, one of the beams experiences a tensile force, the other beam experiencing a compressive force of the same magnitude, these tensile or compressive forces causing the beam's resonant frequency measured by the measurement circuit to vary. A differential measurement is thus obtained, making it possible in particular to overcome certain nonlinear effects.

Such an accelerometer is sensitive to the acceleration only along one axis—the sensitive axis.

It is desirable to be able to measure the acceleration along several axes.

One solution consists in installing several accelerometers—one per axis—but this has the drawback of being expensive and bulky.

An important object of the invention is to propose a microaccelerometer structure that allows measurement of accelerations along several axes without having to use several accelerometers.

SUMMARY OF THE INVENTION

To achieve this object, the invention proposes a differential accelerometer micromachined in a plane plate, comprising a base and a differential measurement cell which includes a moveable seismic mass and two force sensors that are connected to the mass and to the base, principally distinguished by the fact that, under the effect of an acceleration along Ox and/or Oy, Ox and Oy being directions orthogonal to the plane of the plate, the seismic mass is capable of undergoing linear displacement along a direction parallel to the acceleration, and has a center of gravity located at the intersection of a plane A1 perpendicular to the plane of the plate and passing through Ox and of a plane A2 perpendicular to the plane of the plate and passing through Oy and by the fact that a first force sensor comprises, along Ox, two identical detection systems for a differential measurement of the linear displacement along Ox, and associated with each detection system a filtering system connected to the base, and a second force sensor comprises, along Oy, two other identical detection systems for a differential measurement of the linear displacement along Oy, and associated with each detection system a filtering system connected to the base, each filtering system allowing the associated detection system to move along a direction perpendicular to that of its detection without permitting it to move along its detection direction.

Such an accelerometer allows the projection of an acceleration in the plane of the plate to be measured—this is a biaxial differential accelerometer.

In the case for example of a linear displacement of the mass along Ox, the detection systems that are not stressed by this displacement move with the mass along a direction parallel to Ox, as in a slide, thanks to the filtering systems with which they are associated so as not to hamper the linear displacement of the mass and therefore the corresponding measurement.

The same applies in the case of a linear displacement along Oy.

In the general case of a linear displacement along Ox and Oy, the four detection and filtering systems are stressed.

According to one feature of the invention, planes A1 and A2 are planes of symmetry of the measurement cell.

According to another feature of the invention, since the base and the seismic mass have between them a gap along a direction Oz perpendicular to the plane of the plate, the accelerometer includes means for measuring the variation in the gap between the base and the seismic mass for the purpose of measuring the movement of the mass along Oz.

A third axis of measurement for acceleration along Oz is thus added to the two axes Ox and Oy. The three components of the acceleration can then be measured.

Preferably, the detection system is an amplification system for amplifying the force that generates the linear displacement and which comprises for example two rigid terminations and, anchored in these terminations, two vibrating tuning-fork beams located perpendicular to the axis of detection, and two pairs of arms attached, on one side, to the terminations and, on the other side, to the associated filtering system.

Advantageously, the filtering system comprises a body connected, on the one hand, to the associated detection system and, on the other hand to anchoring points via flexure arms that are rigid or quasi-rigid in the detection direction of the detection system and are flexible in the direction perpendicular to that of the detection.

BRIEF DESCRIPTION OF THE DRAWINGS

Other features and advantages of the invention will become apparent on reading the detailed description that follows, given by way of non-limiting example and with reference to the appended drawings in which.

DESCRIPTION OF THE PREFERRED EMBODIMENTS

The accelerometer according to the invention comprises a measurement cell that can be produced by machining an SOI (silicon on insulator) or quartz substrate or another material, but other methods are also possible.

An SOI substrate consists of a fixed monolithic silicon substrate a few hundred microns in thickness (for example 450 μm) constituting the base of the accelerometer, which bears on its front face a thin layer of silicon oxide a few microns in thickness (for example 2 μm) which is itself covered with a layer of single-crystal silicon a few tens of microns in thickness (for example 60 μm). The machining consists in etching the single-crystal silicon via its front face, until the oxide layer is reached, using a selective etchant that etches the silicon without significantly etching the oxide. The etching is stopped when the oxide layer is bared. This oxide layer may itself be removed by selective etching using another etchant so as to preserve only the silicon surface layer. This may thus be etched into the desired surface features by means of photoetching techniques or by another technique commonly used in microelectronics, in order thus to obtain the desired moveable plane structure.

Hereinafter, we will use an (O,x,y,z) coordinate system shown in the figures, in which the plane of the figures, which is that of the plate, is the O,x,y plane, the Oz axis representing the direction perpendicular to this plane. A1 denotes the plane perpendicular to the plane of the plate and passing through Ox and A2 denotes the plane perpendicular to the plane of the plate and passing through Oy. From one figure to another, the same elements will be denoted by the same references.

Figure 1:
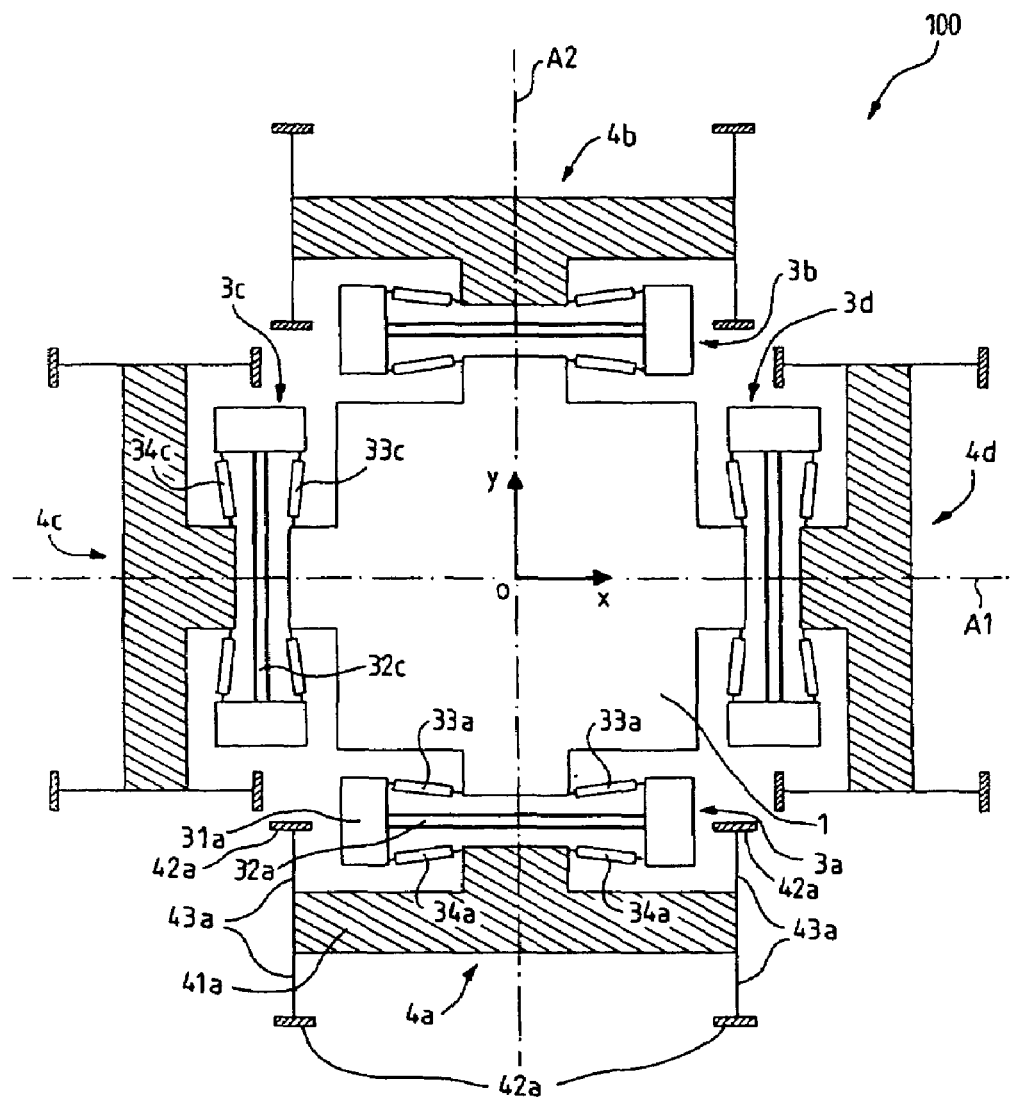
FIG. 1 shows schematically a first embodiment of an accelerometer according to the invention.

The moveable plane structure of a measurement cell 100 of the accelerometer, shown schematically in FIG. 1, comprises two force sensors and a moveable seismic mass 1, the center of gravity of which is at the intersection of the planes A1 and A2 and which is capable of undergoing linear displacement in the plane of the plate, that is to say along Ox and/or Oy.

Preferably, as illustrated in the figures, the planes A1 and A2 are planes of symmetry of the measurement cell 100.

A first force sensor comprises two detection systems 3a, 3b, which are mutually identical and centered on the Oy axis, making it possible to carry out a differential measurement of the projection onto Oy of the linear displacement of the mass 1; likewise, a second force sensor comprises two other mutually identical systems 3c, 3d, centered on the Ox axis and making it possible to carry out a differential measurement of the projection onto Ox of the linear displacement of the mass. Of course, all four detection systems may be identical, as is the case in the figures.

The first force sensor also includes two filtering systems 4a, 4b, one filtering system being associated with a detection system (3a, 3b); likewise, the second force sensor also includes two filtering systems 4c, 4d, one filtering system being associated with a detection system (3c, 3d). As in the case of the detection systems, the filtering systems are identical pairwise, or all four may be identical. One filtering system, 4a for example, allows the detection system 3a with which it is associated to move in the direction perpendicular to that of its detection, in this case along Ox, without permitting movement in the direction of the detection, that is to say Oy. In other words, the detection systems have a preferential detection axis.

Thus in the case, for example, of a linear displacement of the seismic mass 1 along Ox, not only are the two detection systems 3a, 3b not stressed by this displacement, but without the presence of the two associated filtering systems 4a, 4b they could hamper it. This is because these filtering systems allow the detection systems 3a, 3b to move with the mass 1 along Ox, as in a slide, so as not to hamper the displacement of the mass 1 and therefore the corresponding measurement. Likewise, in the case of a linear displacement of the mass 1 along Oy, the two filtering systems 4c, 4d will allow the detection systems 3c, 3d to move with the mass along Oy.

In the example shown in FIG. 1, the four detection systems are identical. One of these systems, for example the system 3a, will be described, it being understood that this description can be readily transposed in the case of the other three. As shown in this figure, the system 3a is preferably a system for amplifying the force that generates the linear displacement of the mass 1, this force being measured by means of two vibrating beams 32a forming a tuning fork, which beams experience a tensile force or a compressive force in the direction of the projection of the acceleration along Oy. The beams are centered on the plane of symmetry A2 of the structure and placed symmetrically with respect to this plane.

The vibrating beams 32a are embedded at each end in a rigid termination 31a. Each of these terminations 31a comprises a pair of micromachined arms. The two pairs are symmetrical with respect to the axis of the beams 32a. A first pair of micromachined arms 33a connects the termination 31a to the seismic mass 1. A second pair of micromachined arms 34a, which are symmetrical with the first pair of arms with respect to the axis of the beams, connects the detection system 3a to the associated filtering system 4a. These arms 33a and 34a are connected to the seismic mass 1 and to the filtering system 3a, respectively, by attachment points. The thickness of an arm 33a or 34a may vary along its length. The function of these pairs of arms 33a and 34a is to amplify the projection onto Oy of the force that generates the linear displacement of the mass 1.

The detection system 3b is symmetrical with the system 3a with respect to Ox. The detection system 3c is a system 3a that has pivoted through 90°. The beams 32c are centered on A1 and placed symmetrically with respect to this plane and the two pairs of arms 33c and 34c are symmetrical with respect to the axis of the beams. The detection system 3d is symmetrical with the system 3c with respect to Oy.

In an alternative embodiment, the two vibrating beams 32a forming a tuning fork are replaced with a single vibrating beam.

According to another alternative embodiment, one or more vibrating beams are placed along the axis of the detection. They may be directly anchored, on one side, to the seismic mass 1 and, on the other side, to the associated filtering system or they may be connected to the seismic mass and to the associated filtering system by amplification means.

The detection systems may also be based on capacitive detection using, for example, interdigitated, or piezoresistive, combs known to those skilled in the art.

In the example shown in FIG. 1, the four filtering systems are identical. One of these systems, for example the system 4a, will be described, it being understood that this description is, here too, readily transposable in the case of the other three. As shown in this figure, the system 4a comprises a body 41a connected, on the one hand, to the detection system 3a by the pair of arms 34a and connected, on the other hand, at anchoring points 42a to the base by means of double arms 43a that are very rigid in the detection direction of the system 3a, in this case Oy, and very flexible in the perpendicular direction, in this case Ox. There are as many arms as anchoring points and they are placed so as to maintain the symmetry of the structure. The example shown in FIG. 1 has four linear arms. The number of these may be increased, while maintaining the symmetry of the structure; they may also be articulated.

The filtering system 4b is symmetrical with the system 4a with respect to Ox. The filtering system 4c is a system 4a that has pivoted through 90°.

In the above description, the suffixes a, b, c and d are indicated in the reference numbers relating to the detection systems or filtering systems. They are not indicated when the reference numbers apply to one or other of these systems.

Figure 2:
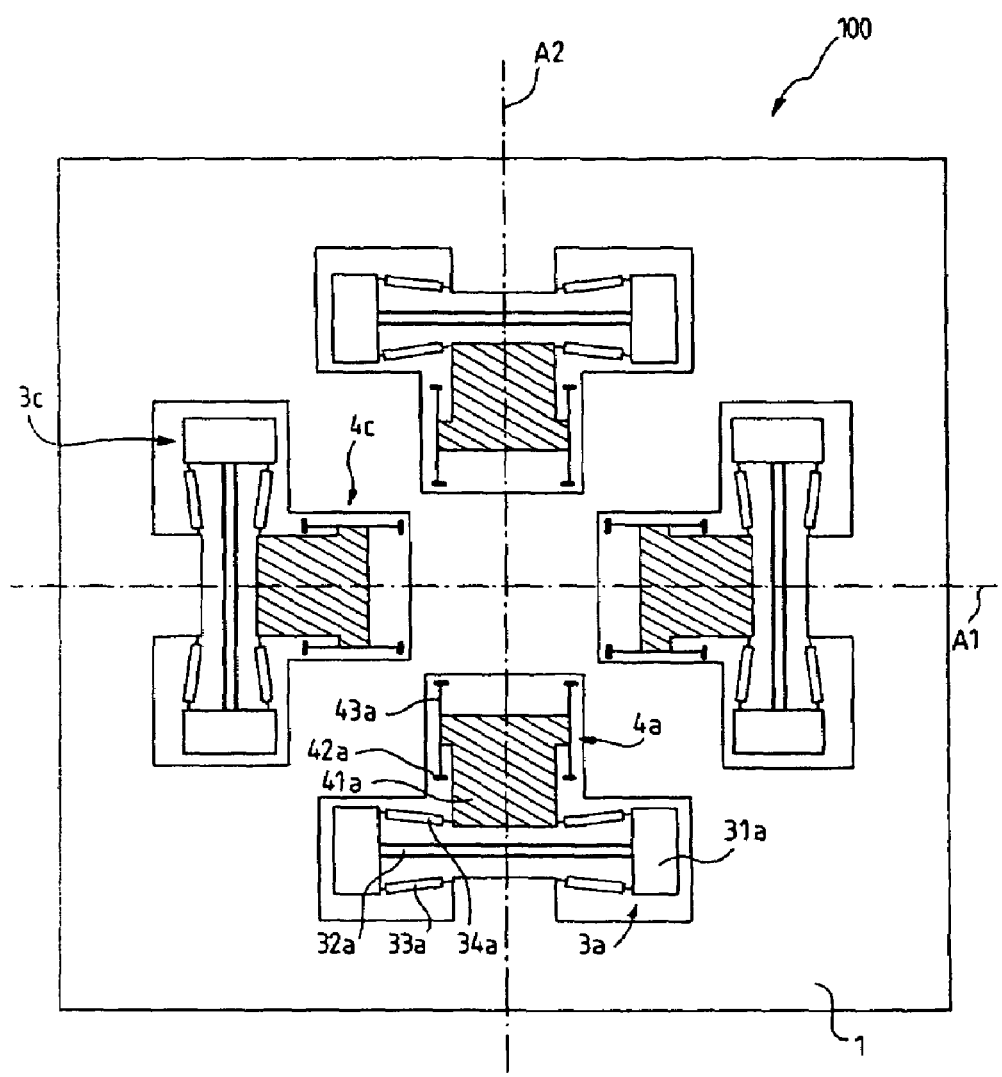
FIG. 2 shows schematically a second embodiment of an accelerometer according to the invention.

Another embodiment of an accelerometer according to the invention is shown in FIG. 2, in which the filtering systems are turned over so that the anchoring points are toward the interior of the measurement cell. In this way, the thermomechanical stresses induced by the mutual separation of the anchoring points are reduced. The term "thermomechanical stresses" is understood to mean the stresses associated with the difference in mechanical behavior between the base and the measurement cell as a function of temperature. The more the anchoring points are grouped together in a small region, the more this difference is limited to this small region.

Furthermore, in this case, the detection systems 3a, 3b, 3c and 3d are placed facing the outside of the measurement cell, since their associated filtering systems 4 face the inside. To be connected to the detection systems 3, the seismic mass 1 is then itself also transferred to the outside of the measurement cell, in the form of a frame. It also extends preferably into the free space lying between the force sensors, facing the inside as shown in FIG. 2, which results in a seismic mass that is heavier than in the example of FIG. 1.

This figure shows detection systems 3 and filtering systems 4 that are identical to those in FIG. 1. The alternative embodiments described in relation with this FIG. 1 also apply to this second embodiment.

In these embodiments, the only regions not etched by the oxide etching are the anchoring points 42.

Figure 3:
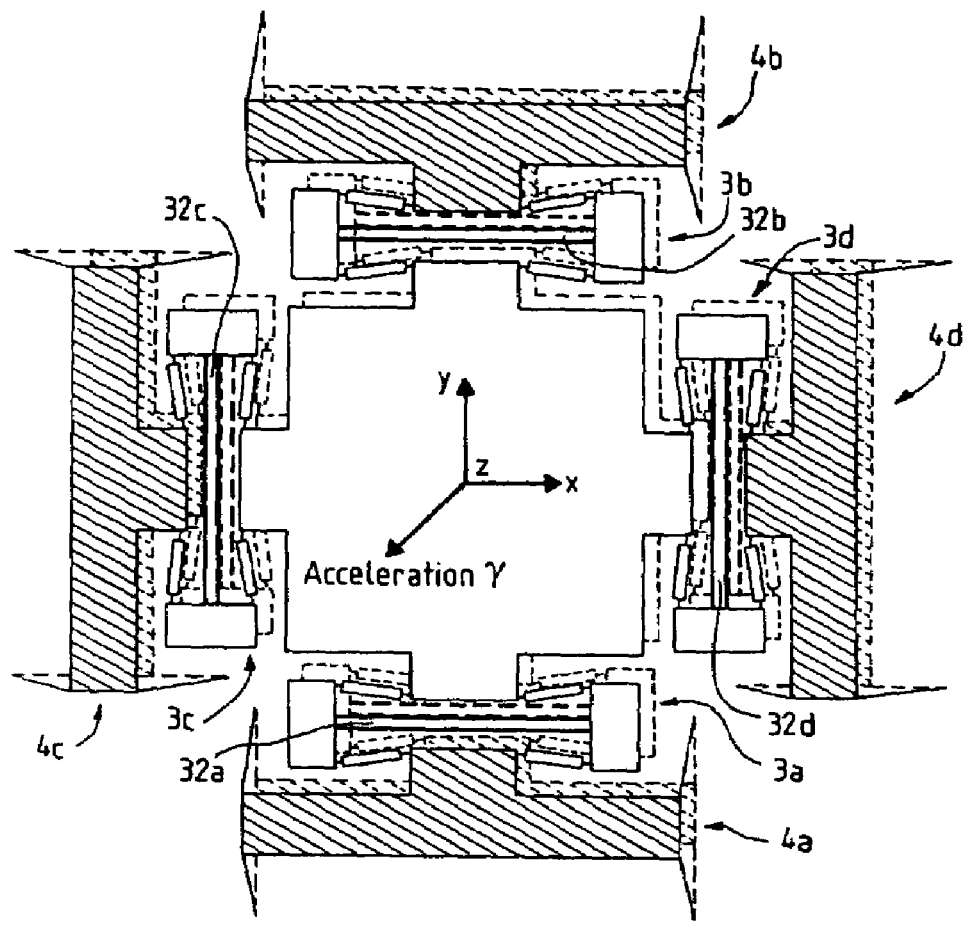
FIG. 3 illustrates schematically the operation of an accelerometer like the one shown in FIG. 1.

FIG. 3 illustrates the operation of an accelerometer according to the invention in the case of any acceleration γ having a negative component along Ox and along Oy. This operation is illustrated by the example of the accelerometer shown in FIG. 1, but it could just as well be with that shown in FIG. 2 or one of their alternative embodiments. The measurement cell at rest is shown by dotted lines, and in the solid lines when it is subjected to an acceleration γ.

This acceleration γ generates a linear displacement of the seismic mass 1 along a direction parallel to the projection of the acceleration γ in the plane of the plate; the projections on the Ox and Oy axes of this displacement are measured by the detection systems 3c and 3d on the one hand and 3a and 3b on the other hand, and their associated filtering systems, respectively. The beams 32a and 32c of the detection systems 3a and 3c are stressed in compression and those 32b and 32d of the systems 3b and 3d are stressed in tension. Although the projection on the Ox axis is measured by the systems 3c and 3d, it also moves the filtering systems 4a and 4b, which allow the systems 3a and 3b, respectively, to accompany the linear displacement of the mass along Ox. Their movement along Ox is practically equivalent to that of the seismic mass along Ox.

Likewise, although the projection on the Oy axis is measured by the systems 3a and 3b, it also moves the filtering systems 4c and 4d which allow the systems 3c and 3d, respectively, to accompany the linear displacement of the mass along Oy.

The accelerometers as described above allow the projection of an acceleration in the plane of the plate to be measured. According to an alternative embodiment of the invention, which applies to the first just like the second embodiment, a third axis for measurement of the acceleration along Oz is added to the two axes Ox and Oy. The three components of the acceleration can then be measured.

According to this alternative embodiment, the base and the seismic mass are, for example, biased, thus forming a capacitor whose capacitance varies as a function of the gap between them. The component along Oz of the acceleration generates a linear displacement of the seismic mass also along Oz; this displacement results in a variation in the gap between the base and the mass, which therefore induces a variation in the capacitance of the capacitor.

This linear displacement then stresses the four detection systems 3a, 3b, 3c and 3d in tension; however, because of the symmetries of the measurement cell, these effects cancel one another out when differential measurements are carried out along Ox and Oy.

Figure 4:
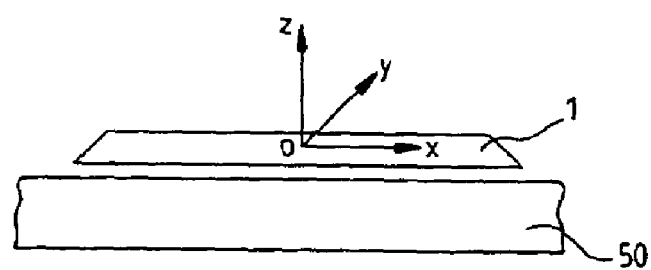
FIG. 4 shows schematically a sectional view on A1 or A2 of an improvement of an accelerometer according to the invention.

As already indicated, the seismic mass is such that its center of gravity is located at the intersection of the planes of symmetry A1 and A2. Optionally, the seismic mass is trapezoidal in shape, as shown in FIG. 4 in a partial sectional view on Ox or Oy.

What is claimed is:

1. A differential accelerometer micromachined in a plane plate, comprising:
   a base and a differential measurement cell which includes a moveable seismic mass and two force sensors that are connected to the mass and to the base, wherein, under the effect of an acceleration along Ox and/or Oy, Ox and Oy being directions orthogonal to each other, the seismic mass is capable of undergoing linear displacement along a direction parallel to the acceleration, and has a center of gravity located at the intersection of a plane A1 perpendicular to the plane of the plate and passing through Ox and of a plane A2 perpendicular to the plane of the plate and passing through Oy and wherein a first force sensor comprises, along Ox, two identical detection systems for a differential measurement of the linear displacement along Ox, and associated with each detection system a filtering system connected to the base, and a second force sensor comprises, along Oy, two other identical detection systems for a differential measurement of the linear displacement along Oy, and associated with each detection system a filtering system connected to the base, each filtering system allowing the associated detection system to move along a direction perpendicular to that of its detection without permitting it to move along its detection direction.

2. The accelerometer as claimed in claim 1, wherein the planes A1 and A2 are planes of symmetry of the measurement cell.

3. The accelerometer as claimed in claim 1, wherein the base and the seismic mass have between them a gap along a direction Oz perpendicular to the plane of the plate, includes means for measuring the variation in the gap between the base and the seismic mass for the purpose of measuring the movement of the mass along Oz.

4. The accelerometer as claimed in claim 3, wherein the base and the seismic mass form a capacitor and wherein the means for measuring the variation in the gap are means for measuring the variation in the capacitance of the capacitor.

5. The accelerometer as claimed in claim 1, wherein the four detection systems are identical.

6. The accelerometer as claimed in claim 1, wherein the detection system(s) is a resonant or capacitive or piezoelectric system.

7. The accelerometer as claimed in claim 6, wherein the detection system is a resonant system which comprises at least one vibrating beam or two vibrating tuning-fork beams which is or are located along the detection axis.

8. The accelerometer as claimed in claim 1, wherein the detection system(s) is an amplification system for amplifying the force that generates the linear displacement.

9. The accelerometer as claimed in claim 8, wherein the amplification system comprises two rigid terminations and, anchored in these terminations, two vibrating tuning-fork beams located perpendicular to the axis of detection, and two pairs of arms attached, on one side, to the terminations and, on the other side, to the associated filtering system.

10. The accelerometer as claimed in claim 1, wherein the filtering systems are placed toward the outside of the measurement cell relative to the detection systems with which they are respectively associated.

11. The accelerometer as claimed in claim 1, wherein the filtering systems are placed toward the inside of the measurement cell relative to the detection systems with which they are respectively associated.

12. The accelerometer as claimed in claim 1, wherein the filtering system comprises a body connected, on the one hand, to the associated detection system and, on the other hand at anchoring points to the base via flexure arms that are rigid or quasi-rigid in the detection direction of the detection system and are flexible in the direction perpendicular to that of the detection.

13. The accelerometer as claimed in claim 12, wherein the flexure arms are straight or articulated.

14. The accelerometer as claimed in claim 12, wherein the filtering system comprises four flexure arms.

15. The accelerometer as claimed in claim 13, wherein the filtering system comprises four flexure arms.

* * * * *